United States Patent [19]

Garland

[11] Patent Number: 5,266,390
[45] Date of Patent: Nov. 30, 1993

[54] MULTI-LAYERED PLASTIC DROPCLOTH AND LIKE SHEET-LIKE COVERS

[75] Inventor: Patrick J. Garland, Green Bay, Wis.

[73] Assignee: Tufco Industries Inc., Green Bay, Wis.

[21] Appl. No.: 901,081

[22] Filed: Jun. 19, 1992

[51] Int. Cl.$^5$ .................. B32B 3/00; B32B 23/02; B32B 27/00; D04H 1/04
[52] U.S. Cl. .................. 428/216; 428/141; 428/156; 428/192; 428/284; 428/286; 428/296
[58] Field of Search ............ 428/216, 192, 141, 284, 428/286, 296, 156

[56] References Cited

U.S. PATENT DOCUMENTS

| | | | |
|---|---|---|---|
| 4,913,954 | 4/1990 | Mack | 428/213 |
| 4,973,375 | 11/1990 | Nishida et al. | 156/243 |
| 4,981,747 | 1/1991 | Morman | 428/198 |
| 5,061,553 | 10/1991 | Olsen, Jr. | 428/215 |
| 5,064,724 | 11/1991 | Ofstein | 428/501 |
| 5,071,686 | 12/1991 | Genske et al. | 428/516 |
| 5,080,960 | 1/1992 | Smorada | 428/213 |

*Primary Examiner*—George F. Lesmes
*Assistant Examiner*—Kathryne Elaine Shelborne
*Attorney, Agent, or Firm*—Andrus Sceales Starke & Sawall

[57] ABSTRACT

A multiple layer plastic dropcloth includes outer layers of spun bonded polypropylene film intimately bonded to an intermediate film of either a polyethylene film or a polypropylene film. The films are mounted in superimposed relation and thermally bonded to each other. The spun bonded polypropylene film absorbs and transmits liquids such as paint, wood stains, paint thinners, solvents and the like. The polyethylene film and the polypropylene film are impervious to such liquids and prevent transmission through the dropcloth of material absorbed by the outer surfaces. The dropcloth surface treated to form similar form of opposed surfaces with small closely spaced impressions extending uniformly over the cloth. The surface treatment contributes to the softness of the dropcloth as well as improves the gripping characteristic of the dropcloth to the cover surface to be protected. Indefinite film lengths can be passed between heating units and opposed fusion rolls to simultaneously effect a fusion bonding of the plastic films. Embossing can be made by appropriate embossing rolls.

10 Claims, 1 Drawing Sheet

MULTI-LAYERED PLASTIC DROPCLOTH AND LIKE SHEET-LIKE COVERS

BACKGROUND OF THE INVENTION

This invention relates to multi-layered dropcloths and like sheet-like covers.

Dropcloth and like sheet-like covers are used where a liquid or fluid product, such as paint and paint related items, wall-paper paste, cleaners and the like are being applied to surfaces such as ceilings and walls which need to be protected from any spillage of the fluid product being applied to these surfaces. Dropcloths made of traditional cloth fabric, such as a canvas material and the like, are now widely used and have been used for many years to protect floors, fixtures, ground cover and the like doing painting, washing and other-like finishing of vertical wall surfaces, ceilings and the like. More recently, plastic sheeting, such as thin polyethylene sheeting has also been used. Although the dropcloths and other sheet-like members heretofore used have provided certain protection, the prior art products have certain disadvantages. Canvas dropcloths may permit the fluid product to penetrate and pass through the cloth, particularly where the fluid product is or has been thinned significantly. Thus, paint thinners and removers can penetrate as well as various paints, particularly if thinned. There is also a wide range of weights and weaves in this cloth material which make the product very inconsistent. Plastic sheeting, as generally provided, will not allow any such inconsistent penetration of the fluid product. However, plastic sheeting for use as a dropcloth is generally a quite thin sheet and has limited tear resistance. Further, plastic has a tendency to slip and may not remain in a desired arrangement and also cause slippage of the working personnel. In addition, the plastic film dropcloth does not absorb the paint or other product, remains on the surface and can be picked up by clothing, footwear and the like coming into engagement therewith and cause tracking to adjacent carpeting or other floor surfaces.

There is therefore a need for a relatively simple, inexpensive and effective dropcloth which has good gripability to the covered surface, high absorption of the applied fluid products, but in such a manner that penetration through the dropcloth is maintained. The dropcloth must also have a significant flexibility to allow appropriate draping thereof over the dimensional objects, and be consistent in form.

SUMMARY OF THE PRESENT INVENTION

The present invention is directed to a multiple layer and integrally bonded plastic sheet-like member including opposite outer plastic layers of a material which absorbs and transmit fluid materials, such as paint, wood stain, paint thinners, solvents and the like in combination with an intermediate plastic layer formed of a plastic film which is essentially totally impervious to the same fluid materials and prevents transmission thereof from one other layer to the other. The two outer layers are also selected to have an effective gripping surface such that the sheet remains in a draped position onto a supporting surface including flat and raised surfaces. The multi-layered bonded plastic sheet-like member thus provides soft, absorbent exterior surfaces in combination with positive prevention of movement of the liquid through the dropcloth.

More particularly, the present invention, in a preferred construction of a dropcloth, includes outer layers of spun bonded polypropylene film intimately bonded, utilizing suitable bonding process such as point bonding with rubber-over-steel or steel-over-steel apparatus, heat bonding technology or pattern spray adhesive laminating, to an intermediate or inner film selected from polyethylene or polypropylene. The spun bonded polypropylene is an absorbent film while the intermediate polyethylene or polypropylene film is impervious to liquids. The films are mounted in superimposed relation and bonded to each other. An elongated member of indefinite length which is subsequently processed to form successive dropcloths can be constructed by passing of three superimposed films through a pair of opposed bonding rollers, for laminating of the films to form a single integrated flexible drop cloth. The film may be thermally bonded by applying heat and pressure to simultaneously effect fusion bonding of the plastic films to each other and form a drawn plastic member having a high degree of flexibility or adhesive laminating of the films, with or without heat. In point bonding, care should be taken to maintain the integrity of the impervious character of the inner film layer. Alternatively, a suitable adhesive may be applied to the opposed faces of the films and past through rollers for adhesively bonding the film to form an integrated drop cloth.

The multiple layer dropcloth in another significant teaching of the invention may also be embossed to form similar small and closely spaced impressions in the opposite or outer layers, with the impression uniformly distributed through the dropcloth in the preferred construction. This surface treatment further contributes to the softness of the dropcloth as well as improves the gripping or grasping characteristic of the dropcloth on the under surfaces to be protected. The surface embossment can be formed in any suitable manner such as by appropriate embossing rolls forming a part of the bonding machine, including forming an integrated part of the bonding rollers.

More particularly, the dropcloths of the present invention are conveniently formed by laminating elongated web of the appropriate film materials through an in-line apparatus to permit subsequent in-line forming of individual dropcloths for subsequent distribution and sale. The inventors have found that the present invention provides a highly satisfactory and improved dropcloth with respect to the prior art dropcloths which have been and are of available.

BRIEF DESCRIPTION OF THE DRAWING

The drawing herewith generally illustrates the best mode presently contemplated for carrying out the invention and is described hereinafter.

In the drawing.

DESCRIPTION OF THE ILLUSTRATED EMBODIMENT

Figure 1:
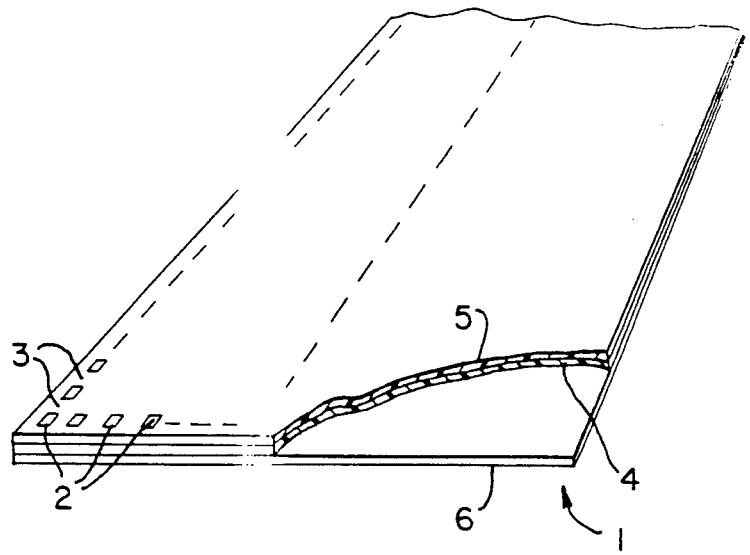
FIG. 1 is a plan view of a dropcloth constructed in accordance with the present invention with portions broken away to illustrate the multiple layered construction.
Figure 2:
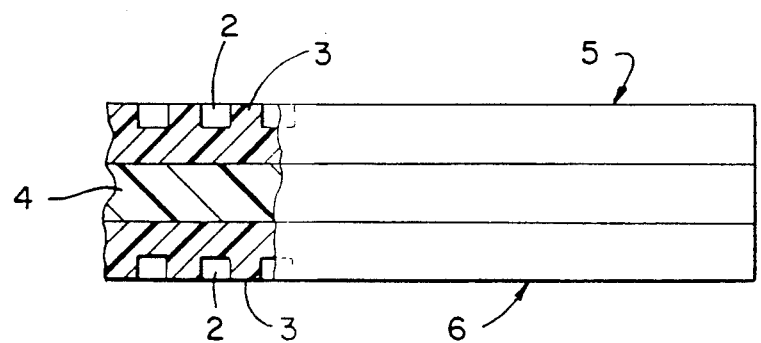
FIG. 2 is an enlarged end view with parts broken away and section to illustrate a section through a portion of the dropcloth shown in FIG. 1.

Referring to the drawing and particularly to FIG. 1, a dropcloth 1 is shown as a substantially rectangular sheet-like member especially useful as a painter's dropcloth. The opposed surfaces of the dropcloth are embossed to provide a uniform distribution of small surface depressions 2 separated by similar small raised portions 3. The dropcloth, as shown with particular reference to FIG. 2, is a relatively thin plastic member and is adapted to lie flat or to be draped over articles and items, such as furniture, outside bushes and the like to protect the item when painting or spraying of an adjacent vertical surface, overhead surface or the like with a liquified fluid product.

Figure 3:
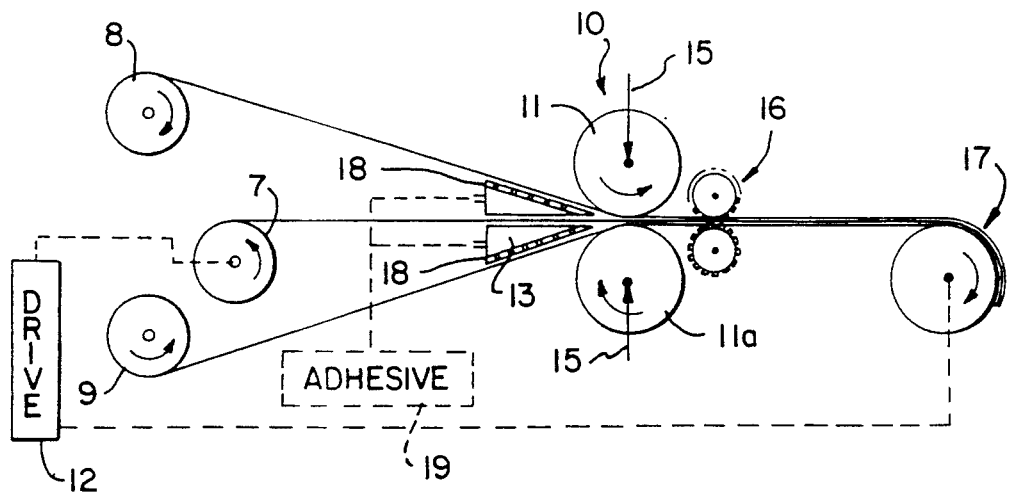
FIG. 3 is a simplified view of a bonding apparatus for forming of a composite multiple layer web and dropcloths such as shown in FIGS. 1-3 inclusive.

Referring particularly to FIG. 3, a substantially enlarged fragmentary cross sectional view is illustrated of a three-layered multi-layer dropcloth. The dropcloth includes a central plastic layer 4 formed of a suitable thin plastic film which is impervious to moisture and any liquified product and thus prevents transfer of even thin liquids and other fluids through the dropcloth. Similar outer plastic layers 5 and 6 of a special moisture absorbing plastic film are intimately bonded to the center layer 4, preferably with a fusion-type bond so as to merge the films while maintaining the basic integrity and characteristics of each of the films.

The outer layers 5 and 6 are thus formed of a suitable plastic which has been specially formed or treated to absorb moisture-based products and the like. The outer fused layers 5 and 6 thereby function to absorb and retain moisture-laden products, other thin liquidified products and the like. The inner or center layer 4 is a plastic layer which does not absorb or transmit moisture or similar liquid products such as paints, wood stains, paint thinners, solvents and the like.

More particularly, the center layer 4 is preferably a film of polyethylene or polypropylene. The polyethylene is a relatively low or linear low density polyethylene in contrast to high density polyethylene in order to maintain a significant degree of flexibility in the multi-layer dropcloth while maintaining an impervious characteristic. A typical polyethylene film is biaxially oriented, heat sealable and treated for lamination; and is substantially within a range of 0.0005 to 0.002 mils thick. A typical lamination may be a treated linear low or low density polyethylene film, also substantially within a range of 0.005 to 0.002 mils thick. Suitable plyethylene film is availabe from Quantum Plastic. A polypropylene film of the same character is available from Delta Plastics and from Carlisle Plastics Corporation, and has been incorporated as the center layer of the dropcloth.

A particular plastic film for use in the outer layers 5 and 6 is spun bonded polypropylene. Such film material is also relatively thin and maintains a flexible characteristic when combined with a polyethylene or polypropylyene film. An inner polyproplyene film is more readily bonded to the above outer layers. In addition, the combination forms a touch, strong cloth member. A most significant characteristic of the spun bonded polypropylyene material is an absorbent characteristic of the materials which absorbs and holds thin liquids including moisture, paint thinners, wood stains and solvents and the like. A satisfactory film material which has been used as the outer layer is a spun bonded polypropylene film having a surface pattern and commercially available in a thickness of one to two ounces per square yard from Polybond, Inc. or Veratec, a Division of International Paper.

A typical dropcloth, in accordance with the present invention when formed of the described films, preferably is made with a total thickness substantially in the range of 0.0015 to 0.004 mils. Although dropcloths or like covers of greater thickness may be constructed in accordance with the present invention, the cloth may not have the significant flexibility required in dropcloth and application because of the stiffness of the thicker cover. Actual tests of a multiple layered dropcloth as described, in comparison to traditional commercial canvas dropcloths, has clearly established that various latex paints, paint thinners and solvents which can pass through canvas dropcloths are captured and retained by the dropcloth constructed in accordance with the present invention. Further, the multiple layer dropcloth has a toughness and tear resistance equal to canvas and superior to prior art plastic dropcloths.

FIG. 3 is a diagrammatic illustration of a machine line for forming of the multiple layered dropcloth.

The several material layers 4, 5 and 6 are provided as relatively large supply rolls of the respective films, and shown consisting of an individual center film roll 7 and two separate outer film rolls 8 and 9. The rolls 7, 8 and 9 are shown mounted in vertical off-set alignment to one side of a film bonding apparatus 10. A suitable drive system is coupled to the rolls and apparatus 10 for passing of the films from the three rolls through the bonding apparatus at an appropriate fixed speed and then downstream to final processing apparatus, which may be a simple storage roll, as shown, or an in-line film cutting machine for forming of individual dropcloths with suitable assembly and packaging apparatus. The bonding apparatus is illustrated as including a pair of vertically stacked bonding rolls 11 and 11a which are mounted in aligned stacked relation and define a nip between which the three films from the three rolls 7, 8 and 9 and are simultaneously passed at the same speed. The rolls 11 and 11a are shown coupled to a drive unit 12 and rotated at a constant speed related to the surface speed of the film. The opposed faces of the films are passed through suitable heating units 13 or otherwise heated to heat such faces prior to moving between the opposed bonding rollers. The heat source should be sufficient to rapidly effectively convert the interface surfaces to form a fusion state while maintaining the integrity of the film layers. A heater unit, not shown, may also be coupled to the rolls 11 and 11a and particularly the outer surfaces. The surface of the rolls 11 and 11a are held at a temperature which raises or holds the temperature of the film material to effect a suitable fusion bond at the interface of the film materials. The rolls are pressurized as diagrammatically shown at 15 to create a controlled pressure over the interface as the films move between the rolls. The combination of the heat and pressure effect a fusion bond at the interface which particularly maintains the integrity of each of the films including the inner polyethylene or polypropylene film so as to maintain the multiple layered dropcloth impervious to the thin liquids while holding such liquids in its surface.

In the illustrated embodiment, surface embossment rolls 16 are shown provided down stream of the fusion bonding rolls. The surface of each roll is provided with appropriate embossing configurations. In the illustrated embodiment, the rolls include substantially aligned small surface projections to deform the film and locate aligned depressions to opposite sides of the film.

The dropcloth film is shown being withdrawn and wound on a receiving roll 17. The roll 16 may be driven at a controlled speed to simultaneously pull the three films from the supply rolls, through the bonding apparatus, the embossing apparatus and form an output roll of the bonded and embossed dropcloth material. As such systems are relatively well known in the art of film processing, further description thereof is not given herein.

Although described as using a heat bonding of the films to each other, any other method of bonding can of course be used within the basic teaching of the present invention. If point bonding is used, care must be taken to maintain the integrity of the inner impervious film layers. Thus, for example, suitable adhesives are available for bonding of the disclosed plastic films.

For example, in accordance with the present invention, a suitable adhesive can be applied to the films immediately prior to passing the several layers through the set of pressure rollers, as shown in phantom, in FIG. 3, the heaters may be replaced with separated application 18 connected to an adhesive source 19. In the illustrated embodiment, the adhesive is applied to the opposite faces of the central polyethylene film and to the inner surfaces of the outer polyproplene film as the film enters into the set of pressure rollers 11-11a. The rollers would provide for firm, smooth interengagement between the interfaces of the layers to provide a high strength laminating of the film to form a single integrated dropcloth.

In addition, a suitable dropcloth could be formed by spot welding, adhesive bonding or otherwise securing of the films to each other to form the drop cloth including the outer absorbent layers in combination with an inner essentially liquid impervious layer. Further, the embossed unit is preferred but is not critical within the teaching of the invention.

The multiple layer dropcloth with the outer spun-bonded polypropylene layer and the inner polyethylene or polypropylene layer provides a cost effective dropcloth which is readily constructed with present day technology and having improved covering and protective capability.

Various modes of carrying out the invention are contemplated as being within the scope of the following claims particularly pointing out and distinctly claiming the subject matter which is regarded as the invention.

I claim:

1. A multiple layer plastic dropcloth for absorbing liquidified products such as latex paint, paint thinners, solvents and the like, comprising:

a first plastic film layer selected from the group consisting of polyethylene film and polypropylene film having a thickness in the range of 0.0005 to 0.002 mils, said first plastic film layer being highly flexible and impervious to liquified products, second and third plastic film layers each consisting of a spunbonded polypropylene polymer in the range of one to two ounces per square yard, said first layer being interposed between said second and third layers and being intimately bonded to said second and third layers throughout the interfaces therebetween, said first layer being formed as a continuous film totally impervious to transfer of said thin liquids, said second and third layers transmitting said thin liquids and thereby holding said thin liquids within said second and third layers and allowing said material to rapidly dry within said layers whereby said thin liquidified product cannot pass through said dropcloth or transfer to other surfaces coming into contact with liquified product.

2. The dropcloth of claim 1, wherein said first layer has a thickness in the range of 0.0005 to 0.002 mils.

3. The dropcloth of claim 2, wherein each of said second and third layers has a thickness in the range of 0.0005 to 0.002 mils.

4. The dropcloth of claim 1, wherein said three layers are selected to form a total thickness in the range of 0.0015 to 0.004 mils.

5. The dropcloth of claims 1 or 2, wherein said opposed surfaces of said dropcloth are formed with a pattern of close space depressions thereby increasing the flexibility and surface area of the dropcloth.

6. The dropcloth of claim 11, wherein said first layer is a polypropylene polymer film.

7. A plastic dropcloth having liquid absorbent capability, comprising a plurality of superimpopsed layers of plastic films including at least one inner plastic layer selected from the group consisting of polyethylene film and polypropylene film and first and second outer plastic layers of plastic films which are spun bonded polypropylene, said inner plastic layer formed of a material impervious to liquid, said outer plastic layers being firmly bonded to said inner layer to form a composite multilayer dropcloth, said outer plastic layers absorbing liquids and thereby capturing liquid dropping onto the dropcloth with said inner layer positively preventing transmission of said liquid through the multilayer dropcloth, said inner and outer layers being formed of a thickness to establish a flexible dropcloth capable of being draped over articles to be protected.

8. The dropcloth of claim 7, wherein each of said layers has a maximum thickness of about 0.002 mils.

9. The dropcloth of claim 7, wherein each of said layers has a minimum thickness of about 0.0005 mils.

10. The dropcloth of claim 7, wherein each of said layers has a maximum thickness of about 0.002 mils and a minimum thickness of about 0.0005 mils.

* * * * *

UNITED STATES PATENT AND TRADEMARK OFFICE
CERTIFICATE OF CORRECTION

PATENT NO. : 5,266,390
DATED : November 30, 1993
INVENTOR(S) : PATRICK J. GARLAND It is certified that error appears in the above-indentified patent and that said Letters Patent is hereby corrected as shown below:

Claim 2, column 6, line 18, after "wherein" insert ---each of---; Claim 2, column 6, line 18, after "said" delete "first layer" and substitute therefor ---layers---; Claim 2, column 6, line 19, before "thickness" insert ---maximum---; Claim 2, column 6 line 19, after "thickness" delete "in the range"; Claim 2, column 6, line 19, after "of" delete "0.0005 to".

Signed and Sealed this

Fifth Day of July, 1994

Attest:

BRUCE LEHMAN

*Attesting Officer*  *Commissioner of Patents and Trademarks*